Oct. 10, 1950     W. K. ROBBINS     2,525,724
CHAIN LINK
Filed Oct. 10, 1945
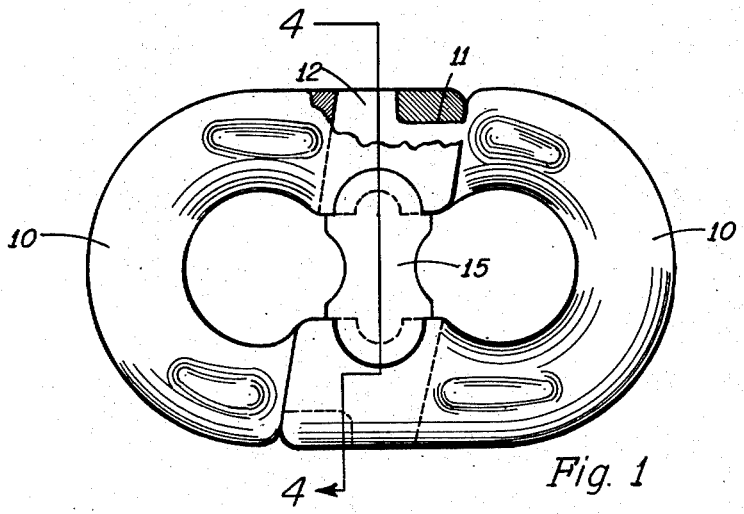
Fig. 1
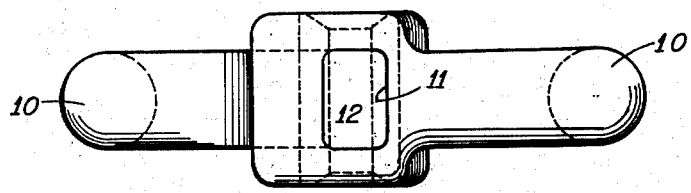
Fig. 2
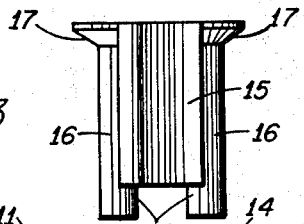
Fig. 3
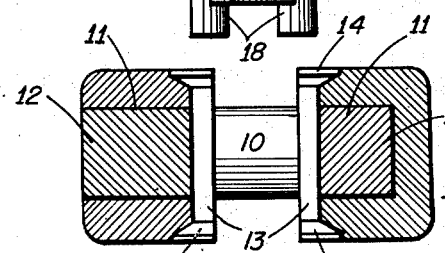
Fig. 4
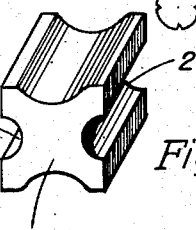
Fig. 6
Fig. 7
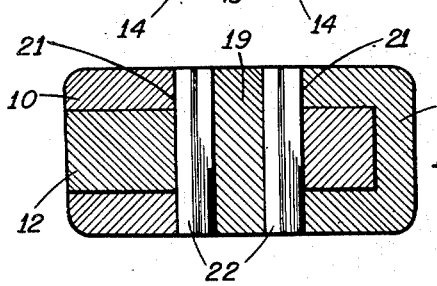
Fig. 5
INVENTOR
William K. Robbins
BY Brayton W Richards
ATTORNEY Patented Oct. 10, 1950

2,525,724

UNITED STATES PATENT OFFICE 2,525,724

CHAIN LINK

William K. Robbins, Milwaukee, Wis.

Application October 10, 1945, Serial No. 621,540

7 Claims. (Cl. 59—85)

The invention relates to improvements in chain links and has for its primary object the provision of an improved chain link formed into two separable parts and provided with improved means for securing said parts against separation.

Another object of the invention is to provide in a separable two-part chain link a floating rigid abutment member spanning the link in rockable bearing contact with interlocked ends of the parts thereof at both sides of the link.

Other objects will appear hereinafter.

The invention consists of the combinations and arrangements of parts hereinafter described and claimed.

The invention will be best understood by reference to the accompanying drawings forming a part of the specification and in which—

Fig. 1 is a side view of a chain link embodying the invention;

Fig. 2, an edge view thereof;

Fig. 3, an enlarged detail view of an abutment member employed in the construction;

Fig. 4, a section taken substantially on line 4—4 of Fig. 1, but showing the abutment member removed;

Fig. 5, a transverse section of a modified form of construction;

Fig. 6, a perspective view of one of two groove drive pins employed in said modified form of construction; and Fig. 7, a perspective view of a modified form of abutment member employed in the construction illustrated in Fig 5 and cooperative with said drive pins.

In the form of construction illustrated in Figs. 1, 2, 3 and 4, the link consists of two separable link halves 10, each having a socket 11 at the end of one limb and a head 12 at the end of the other limb, said sockets and heads being shaped to engage and disengage through lateral movements of one limb of each away from, and toward each other. Partial rivet sockets 13 having countersunk ends 14 are formed in the inner edges of the limbs of the link, as best shown in Fig. 4. An abutment member 15 is arranged to be inserted between the limbs of the said link halves and is provided on each side with an integral partial rivet member 16 having a head 17 adapted and arranged to fit the countersink in the corresponding rivet socket. The ends of the rivet member 16 are extended at 18 so as to be capable of being upset into the countersinks at the other ends of the rivet sockets, as will be readily understood. In this way a chain link is provided which may be readily separated into its halves, and readily secured in cooperative position by merely upsetting the rivet ends 18.

It is a well known fact that chain links tend to lengthen out in service under heavy loads, and in a two-part link as disclosed herein, one side almost invariably elongates to a greater degree than the other. Thus, if my abutment member 15 were secured in place by a transverse receiving pin or the like it would break or shear off and the abutment would soon work loose. However, with my construction when one side of the link 10, 10 elongates more than the other under heavy loads, as stated, the affected half rivet end 16 of my abutment member 15 simply rocks in its rounded bearing 13 and the abutment member angles laterally slightly without shearing or breaking and without loosening of its bracing action. The shoulders (Figs. 1 and 3) at opposite sides of the integral partial rivet portions 16 of abutment member 15 are compressed or indented slightly by opposed portions of the relatively harder link portions to admit of this abutment rocking action taking place. As usual in heavy chains, the link halves 10 will be case hardened or the equivalent whereas the abutment member 15 with its integral partial rivet ends 16 is necessarily of softer rivetable stock, as stated earlier herein. Of course, if and when abutment member 15 makes a loose fit with opposite sides of the link 10, 10 there will be enough play to admit of the stated rocking of the abutment member without compression of the shoulders at opposite sides of the partial rivets 16.

In the modified form of construction illustrated in Figs. 5, 6 and 7 an abutment member 19 is provided in its opposite edges with sockets 20 arranged to register with the sockets 21 in the inner faces of the link limbs. The abutment member 19 is then secured in place by driving groove pins 22 into the combined sockets 20—21, thus securing the parts in place without the necessity of upsetting any rivet heads.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. In combination a chain link comprising two separate link halves, each having a socket at the end of one limb and a head at the end of the other limb; said sockets and heads being shaped to engage and disengage through lateral movement of one limb of each away from, and toward each other, there being partial rivet sockets having countersunk ends formed in the inner edges of each limb of each link; half parallel walls arranged in spaced relation on opposite sides of said partial rivet sockets; on each link half an abutment member arranged to be inserted between the limbs of said link halves in contact with said parallel walls; an integral partial rivet member having a head adapted and arranged to fit the countersink in its corresponding partial rivet socket; and a protruding end on each partial rivet member capable of being upset into the corresponding countersinks at the other ends of said partial rivet sockets.

2. In combination a chain link comprising two separable link halves, each having a socket at the end of one limb and a head at the end of the other limb, said sockets and heads being shaped to engage and disengage through lateral movement of one limb each away from and toward each other, their being a partial rivet socket having a countersunk end formed in the inner edges of each limb of each link half; an abutment member having a body portion arranged to be inserted between the limbs of said assembled link halves; an integral partial rivet member on opposite sides of said body portion having a head adapted and arranged to fit the countersink in its corresponding partial rivet socket; and a protruding end on each partial rivet member capable of being upset into the corresponding countersink at the other end of said partial rivet socket.

3. In a combination chain link having two identical halves, each comprising an integral U-shaped body having a rectangularly shaped hole extending transversely through the end of one limb, the walls thereof serving as a socket; a head at the other end of the other limb having an outwardly projecting head adapted to fit snugly in the rectangularly shaped hole extending transversely through the end of the other limb; opposed inwardly facing half-round notches adapted to be assembled in right angle alignment to said head and said socket; and an abutment member having an outwardly projecting half-round flange on each opposite side thereof, arranged and adapted to yieldably move in the line of stress on said link.

4. In combination with a chain link comprised of separate halves having their mutually opposed ends relatively slidable laterally into a connection interlocked against longitudinal separation, a floating rigid abutment member spanning the link in rockable bearing contact with the interlocked ends thereof at both sides of the link.

5. In combination with a chain link comprised of separate halves having their mutually opposed ends relatively slidable laterally into a connection interlocked against longitudinal separation, a floating rigid abutment member spanning the link in rockable bearing contact with the interlocked ends thereof at both sides of the link, and retaining means on said member in free contact with the link sides to hold the abutment member against disengaging movement in a plane normal to the longitudinal plane of the link.

6. In combination with a chain link comprised of separate halves having their mutually opposed ends relatively slidable laterally into a connection interlocked against longitudinal separation, a floating rigid abutment member spanning the link between the interlocked ends at both sides thereof, and said abutment member having a rounded portion on each end in free bearing contact with the adjacent interlocked ends of the link.

7. In combination, a chain link comprised of separate halves having their mutually opposed ends adapted for relative sliding engagement laterally into a connection interlocked against longitudinal separation, a rigid abutment member adapted for insertion in the link to extend between the sides thereof when the halves are connected, the inner side faces of the link ends at each side of the link having rounded socket grooves adapted for end to end alignment upon the interlocking engagement of the link ends, and said abutment member having on each end a rounded bearing portion adapted to occupy the adjacent rounded socket grooves upon insertion of the abutment member between the connected halves of the link.

WILLIAM K. ROBBINS.

REFERENCES CITED

The following references are of record in the file of this patent:

UNITED STATES PATENTS

| Number | Name | Date |
|---|---|---|
| 859,082 | Kenter | July 2, 1907 |
| 2,357,768 | Robbins | Sept. 5, 1944 |

FOREIGN PATENTS

| Number | Country | Date |
|---|---|---|
| 2,388 | Great Britain | Feb. 1, 1909 |